United States Patent
Shinozaki

(10) Patent No.: US 8,194,574 B2
(45) Date of Patent: Jun. 5, 2012

(54) WIRELESS ACCESS METHOD AND APPARATUS DETERMINING COMMUNICATION CARRIERS TO BE USED IN UPLINK AND DOWNLINK BASED ON TYPE OF SERVICE

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 12/623,981

(22) Filed: Nov. 23, 2009

(65) Prior Publication Data
US 2010/0067411 A1 Mar. 18, 2010

Related U.S. Application Data

(63) Continuation of application No. PCT/JP2007/067033, filed on Aug. 31, 2007.

(51) Int. Cl.
H04L 5/14 (2006.01)
(52) U.S. Cl. .................................................. 370/276
(58) Field of Classification Search .......... 370/276–282, 370/294–296, 310, 328–330, 342–345, 431, 370/436, 437
See application file for complete search history.

(56) References Cited

U.S. PATENT DOCUMENTS

| | | | |
|---|---|---|---|
| 5,539,730 A | 7/1996 | Dent | |
| 5,566,168 A | 10/1996 | Dent | |
| 5,812,952 A * | 9/1998 | On et al. | 455/452.1 |
| 5,943,324 A | 8/1999 | Ramesh et al. | |
| 6,134,227 A * | 10/2000 | Magana | 370/330 |
| 6,407,993 B1 * | 6/2002 | Moulsley | 370/347 |
| 6,963,544 B1 * | 11/2005 | Balachandran et al. | 370/281 |
| 7,058,113 B2 * | 6/2006 | Etoh | 375/130 |
| 7,512,096 B2 * | 3/2009 | Kuzminskiy et al. | 370/329 |
| 7,522,924 B2 * | 4/2009 | Abeta et al. | 455/452.2 |
| 7,684,365 B2 * | 3/2010 | Harrang et al. | 370/329 |
| 7,738,422 B2 * | 6/2010 | Das et al. | 370/330 |
| 7,860,074 B2 * | 12/2010 | Gotesman et al. | 370/347 |
| 2002/0159413 A1 | 10/2002 | Tsubouchi et al. | |
| 2002/0165989 A1 | 11/2002 | Etoh | |
| 2002/0173277 A1 * | 11/2002 | Takao et al. | 455/77 |
| 2007/0121531 A1 * | 5/2007 | Lee et al. | 370/280 |

FOREIGN PATENT DOCUMENTS

| | | |
|---|---|---|
| JP | 9500512 | 1/1997 |
| JP | 2002252865 | 9/2002 |
| JP | 2002330138 | 11/2002 |
| JP | 2003283507 | 10/2003 |
| JP | 2005341297 | 12/2005 |
| JP | 2006054597 | 2/2006 |

OTHER PUBLICATIONS

International Search Report dated Oct. 2, 2007.

* cited by examiner

Primary Examiner — Dmitry H Levitan
(74) Attorney, Agent, or Firm — Murphy & King, P.C.

(57) ABSTRACT

A wireless access method includes connecting a wireless base station and a plurality of wireless terminals using a first communication carrier and a second communication carrier in a hybrid-duplex manner; allocating uplink data of a real-time service to the first communication carrier; allocating uplink data of a non-real-time service to the second communication carrier; allocating downlink data of the real-time service to one of the first communication carrier and the second communication carrier; and allocating downlink data of the non-real-time service to the first and second communication carriers.

9 Claims, 16 Drawing Sheets

FIG.8

| | RELATED ART | | EMBODIMENT | |
|---|---|---|---|---|
| VOICE UPLINK | SINGLE COMMUNICATION CARRIER (POSSIBLE CONTENTION AMONG FOUR LINKS) | VOICE UPLINK | 1ST COMMUNICATION CARRIER f1 (POSSIBLE CONTENTION OF TWO LINKS) |
| VOICE DOWNLINK | | PACKET DOWNLINK | |
| PACKET UPLINK | | PACKET UPLINK | 2ND COMMUNICATION CARRIER f2 (POSSIBLE CONTENTION AMONG THREE LINKS) |
| PACKET DOWNLINK | | PACKET DOWNLINK | |
| — | — | VOICE DOWNLINK | |

WIRELESS ACCESS METHOD AND APPARATUS DETERMINING COMMUNICATION CARRIERS TO BE USED IN UPLINK AND DOWNLINK BASED ON TYPE OF SERVICE

CROSS-REFERENCE TO RELATED APPLICATIONS

This application is a U.S. continuation application filed under 35 USC 111(a) claiming benefit under 35 USC 120 and 365(c) of PCT application JP2007/067033, filed Aug. 31, 2007. The foregoing application is hereby incorporated herein by reference.

FIELD

The present invention generally relates to wireless access methods and apparatuses, and particularly to hybrid-duplex wireless access methods and apparatuses.

BACKGROUND

A hybrid-duplex system has been discussed that employs TDD (time-division duplex, which is a half-duplex technology) and FDD (frequency-division duplex, which is a full-duplex technology) at individual frequencies, wherein a TDD downlink is combined with an FDD line to increase capacity.

With regard to a hybrid FDD/TDD apparatus, it has been discussed that compatibility with an existing FDD terminal is maintained by a slot allocation method by which frequency bandwidths and time-slots are controlled depending on uplink/downlink traffic priorities.

A hybrid TDMA/FDMA/CDMA apparatus has also been discussed in which TDM is used for transmission from a BTS (base transceiver station) for downlink, and FDMA is used at the receiving end for uplink.

It has also been discussed with regard to a hybrid FDM (frequency division multiplex)/TDD system that each user connection is mapped onto basic channels in order of degrading transmission environment.

Patent Document 1: Japanese Laid-Open Patent Application No. 2005-341297
Patent Document 2: Japanese Laid-Open Patent Application No. 2006-54597
Patent Document 3: Japanese Laid-Open Patent Application No. 9-500512
Patent Document 4: Japanese Laid-Open Patent Application No. 2003-283507

SUMMARY

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

According to one aspect of the present invention, a wireless access method includes connecting a wireless base station and a plurality of wireless terminals using a first communication carrier and a second communication carrier in a hybrid-duplex manner; allocating uplink data of a real-time service to the first communication carrier; allocating uplink data of a non-real-time service to the second communication carrier; allocating downlink data of the real-time service to one of the first communication carrier and the second communication carrier; and allocating downlink data of the non-real-time service to the first and second communication carriers.

According to another aspect of the present invention, a wireless base station apparatus in a wireless access system includes a first transmission schedule unit configured to generate transmission schedule information for downlink data of a real-time service allocated to a first communication carrier; a reception timing inferring unit configured to infer a reception timing of uplink data of the real-time service allocated to a second communication carrier, based on the transmission schedule information generated by the first transmission schedule unit; and a second transmission schedule unit configured to generate transmission schedule information for downlink data of a non-real-time service allocated to the second communication carrier by avoiding the reception timing of the uplink data of the real-time service allocated to the second communication carrier that is inferred by the reception timing inferring unit.

According to a further aspect of the present invention, a wireless terminal apparatus in a wireless access system includes an extracting unit configured to extract transmission schedule information for downlink data of a real-time service from at least one of a first communication carrier and a second communication carrier to which the transmission schedule information for the downlink data of the real-time service is attached; and an autonomous schedule unit configured to autonomously generate transmission schedule information for uplink data of a non-real-time service allocated to the second communication carrier, based on the transmission schedule information for the downlink data of the real-time service extracted by the extracting unit.

BRIEF DESCRIPTION OF THE DRAWINGS

FIG. 8 depicts a table for carrier allocation according to an embodiment of the present invention.

DESCRIPTION OF EMBODIMENTS

Figure 1:
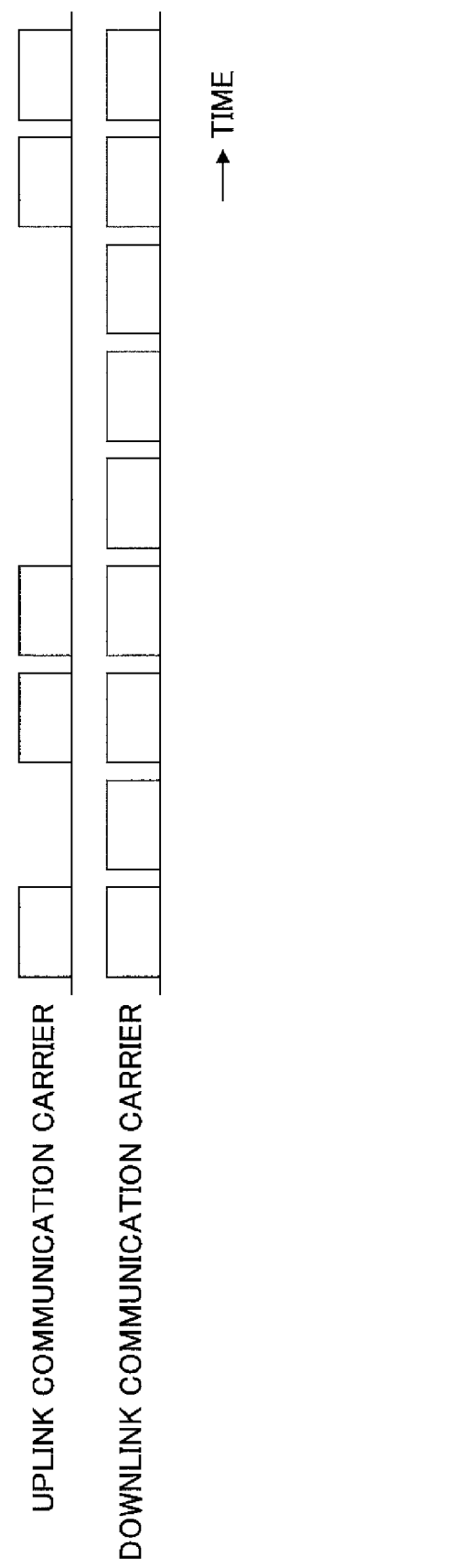
FIG. 1 depicts communication carriers used in an FDD system.

Initially, backgrounds to the embodiments of the present invention are discussed. Current cellular systems may be generally categorized into the frequency division duplex (FDD) systems and the time division duplex (TDD) systems. Hybrid-duplex systems combining FDD and TDD have also been proposed. FIG. 1 illustrates communication carriers (frequencies) used in an FDD wireless network system including a wireless terminal and a wireless base station. As depicted in FIG. 1, the communication carriers (frequencies) are individually allocated for downlink (from the wireless base station to the wireless terminal) and uplink (from the wireless terminal to the wireless base station). Thus, uplink and downlink can be simultaneously utilized.

However, such a wireless network requires a guard band for preventing interference between the individual communication carriers. As a result, frequency utilization efficiency in the case of up/down asymmetric traffic decreases, for example. Thus, the FDD system is generally said to be suitable for circuit switching, i.e., for equal traffic between uplink and downlink, such as in voice service applications. This is one reason why the WCDMA (Wideband-Code Division Multiple Access)-FDD system has high affinity for circuit switching domains.

Figure 2:
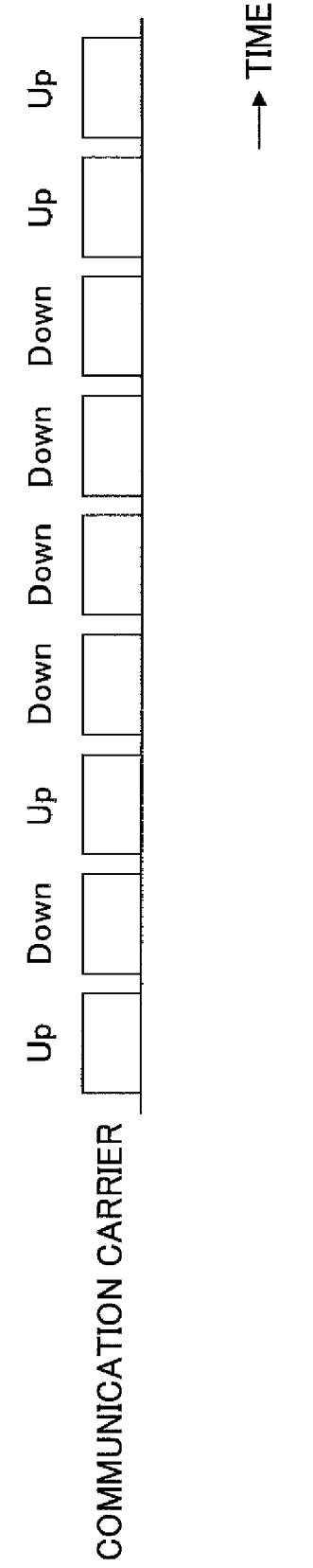
FIG. 2 depicts a communication carrier used in a TDD system.

FIG. 2 illustrates a communication carrier (frequency) for a TDD system, in which time bands are allocated for uplink and downlink. While the system only requires the single communication carrier, simultaneous transmissions in both uplink and downlink cannot be performed. However, some of the technical problems, such as a timing control problem, of TDD have been overcome in recent years, and TDD has high affinity for data communications. For these reasons, TDD is increasingly adopted in wireless network systems. For instance, TDD has been additionally adopted by the 3GPP (Third Generation Partnership Project). However, the frequency bands allocated to TDD systems of various countries are narrower than that of FDD and are in need of further expansion.

Figure 3:
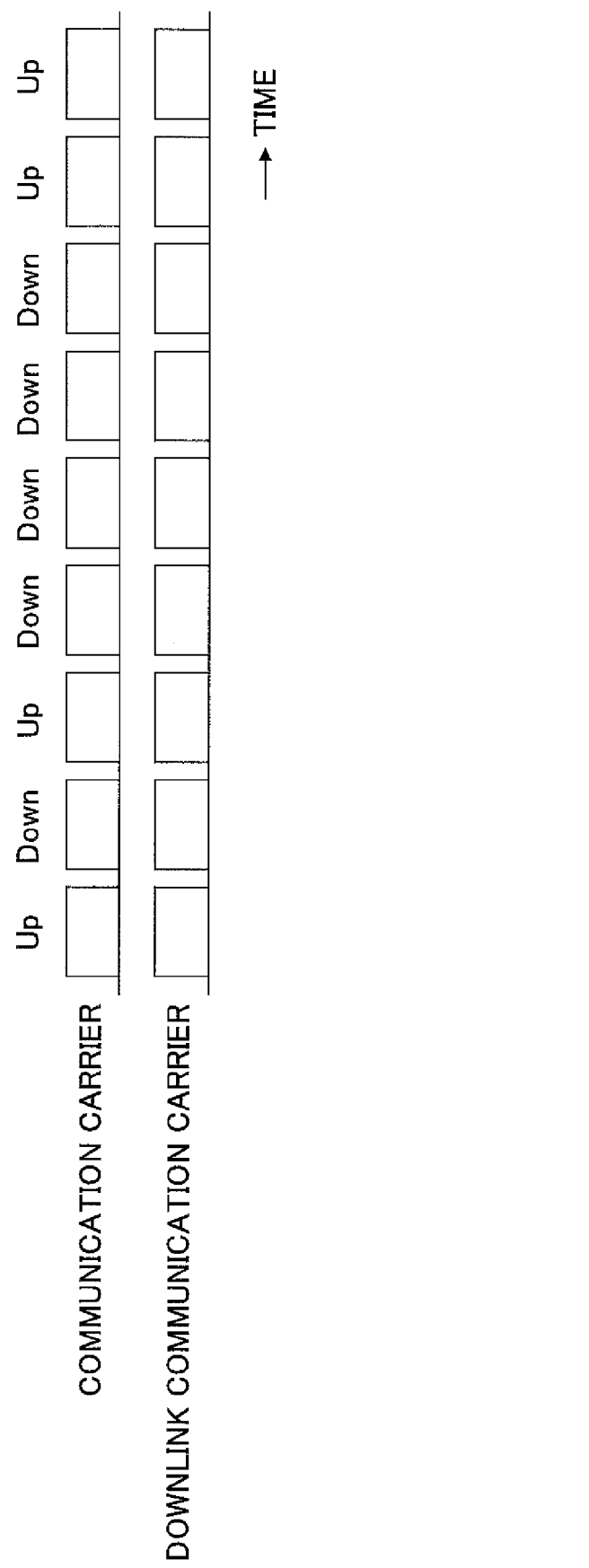
FIG. 3 depicts communication carries used in a hybrid-duplex system.

FIG. 3 illustrates communication carriers for a hybrid-duplex system, which presumes uplink/downlink asymmetric traffic. The hybrid-duplex system includes a first communication carrier and a second, dedicated downlink communication carrier. The first communication carrier uses TDD for uplink and downlink. This system aims to take advantage of TDD by utilizing a frequency band allocated for FDD, which is generally considered the mainstream technology.

Wireless LAN is a half-duplex, single-communication-carrier based technology. It uses the CSMA/CA (Carrier Sense Multiple Access/Collision Avoidance) access control mechanism, which is based on a "listen before talk" method. Specifically, carrier sensing is performed to make sure that no other communications are going on in a channel before access to the channel is allowed. Thus, wireless LAN is similar to TDD in that, although no access occupancy times are clearly defined for either wireless terminals or a wireless base station, both uplink and downlink are accommodated by the single communication carrier.

In CSMA/CA, a wireless terminal or a wireless base station can transmit data when it determines by carrier sensing that the communication channel is idle. However, there is the possibility of access collision because there is no scheduling based on a time-slot system. In order to avoid collisions, a random backoff time based on a contention window (CW) is allocated. After the backoff time elapses, transmission is started.

Figure 4:
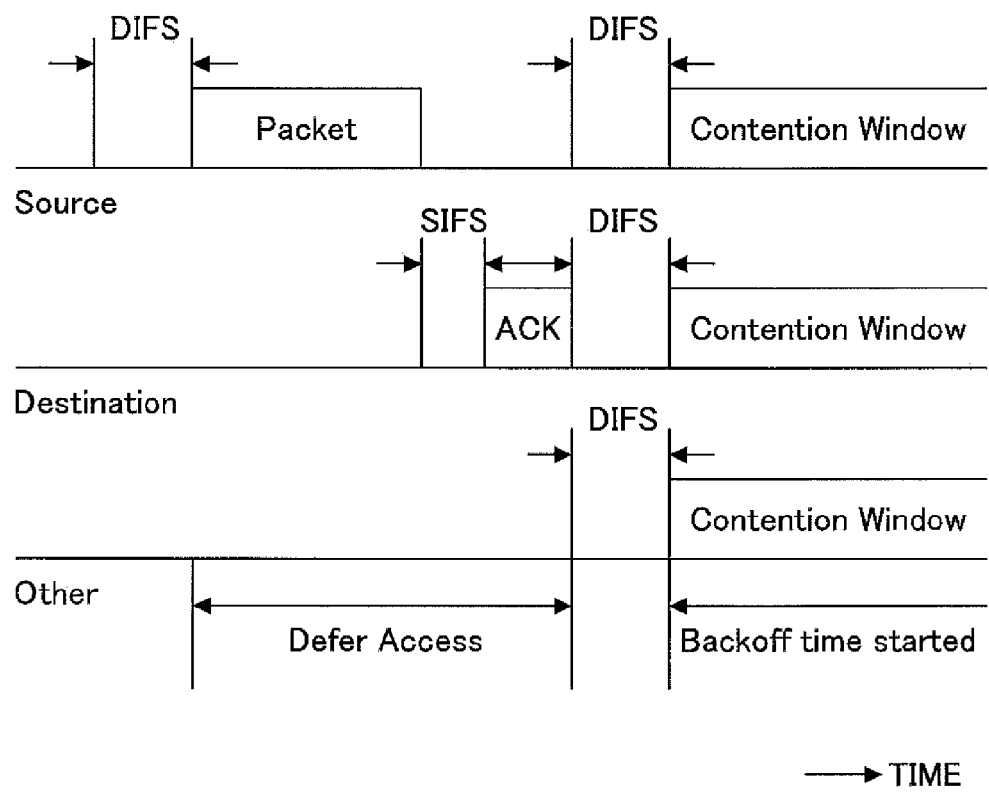
FIG. 4 illustrates a CSMA/CA procedure.

FIG. 4 illustrates a distributed coordination function (DCF) access control procedure in an IEEE 802.11 system. In this procedure, when a communication channel is sensed to be idle in a DIFS (Distributed Inter Frame Spacing) interval, a backoff time based on the CW is inserted.

In contrast to cellular systems, wireless LAN has been used mainly for data communications. In recent years, however, voice services have also been increasingly handled by wireless LAN. One example is VoIP (Voice over IP), which is a packet-based voice communication service. The term "wireless LAN" herein is intended to refer to a wireless communication technology based on the IEEE 802.11 standard.

Because wireless LAN is standardized primarily for data communications, as mentioned above, it presents several problems when handling voice services. For instance, wireless LAN uses the CSMA/CA access control mechanism, whose access arbitration method is not suitable for real-time services. Specifically, the probability of collision increases as the probability of access contention increases.

In recent years, there has been a growing demand for sharing wireless LAN between voice service and data communication. However, when wireless LAN is shared by voice service and data communication, a certain communication channel occupation time is caused by the data communication of wireless terminals due to data communication traffic characteristics, thus significantly affecting the voice service.

Figure 5:
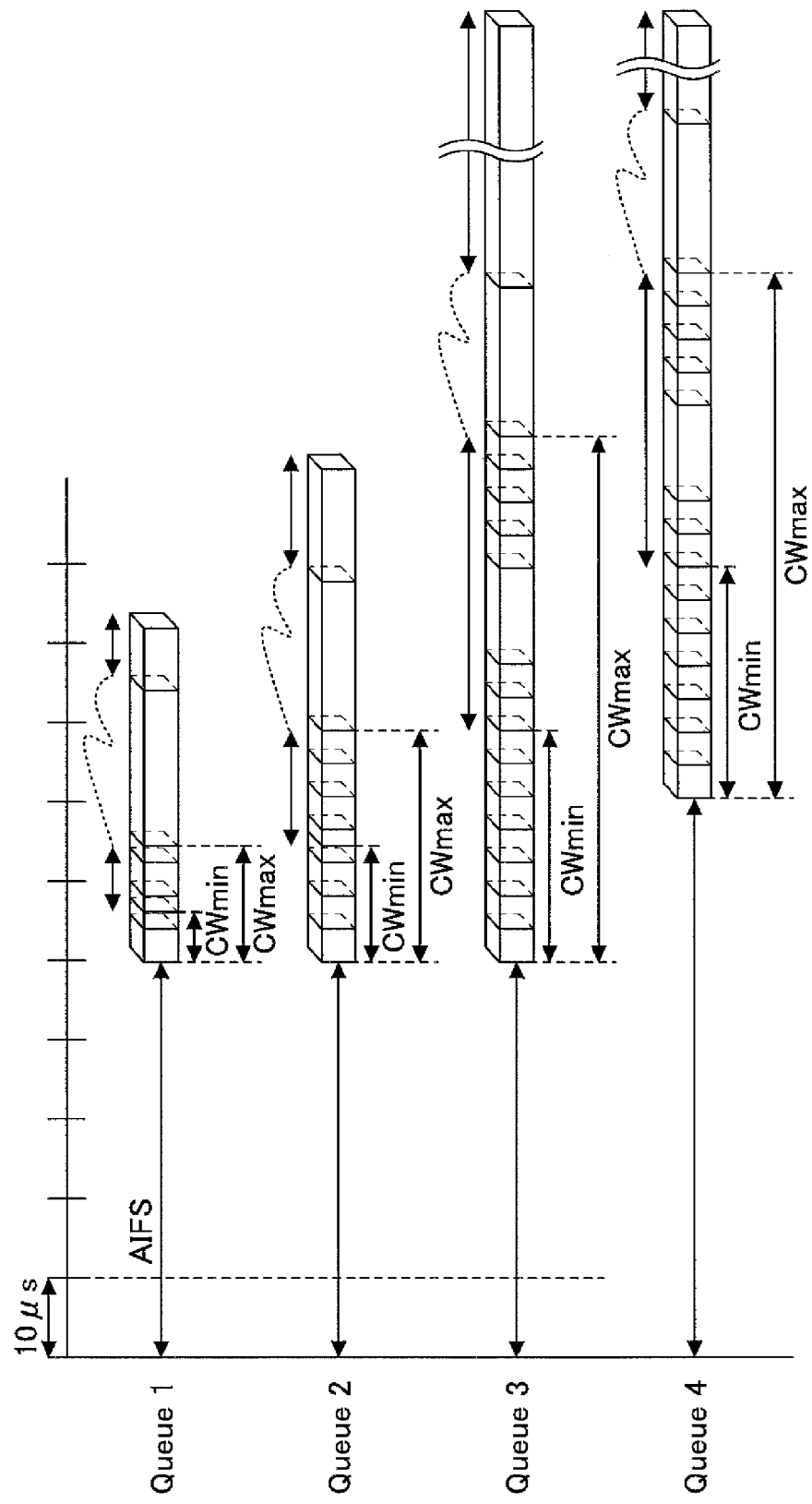
FIG. 5 illustrates an EDCA procedure.

In order to avoid the aforementioned problem, the IEEE 802.11e standard has been developed. IEEE 802.11e proposes an EDCA (Enhanced Distributed Channel Access) system, as illustrated in FIG. 5. In this system, queues are defined for different transmission priorities, wherein the transmission intervals and a back-off time are adjusted for each queue so that queues with higher priority can transmit data earlier. In FIG. 5, AIFS (Arbitration Inter Frame Space) indicates a data frame transmission interval.

However, EDCA is still unable to sufficiently overcome the influence of data communication on voice service, and the problem of access contention is particularly encountered in uplink. Specifically, during an uplink transmission, there may be contention among multiple wireless terminals; thus, the fewer the number of contending parties, the better. However, because a data communication terminal only transmits data when required, the data communication terminal normally does not occupy the communication channel. If, despite this, connections for data communication are not allowed in order to reduce contention with voice service, the data communication service is significantly adversely affected.

On the other hand, voice data is very small compared with packet data. Thus, if the communication channel occupancy time of packet data becomes long, voice service is affected. For instance, when the voice data has 40 octets and the packet data has 1500 octets, a single transmission of the packet data may eliminate thirty times or more of opportunities for transmitting the voice data.

<Principle>

Figure 6:
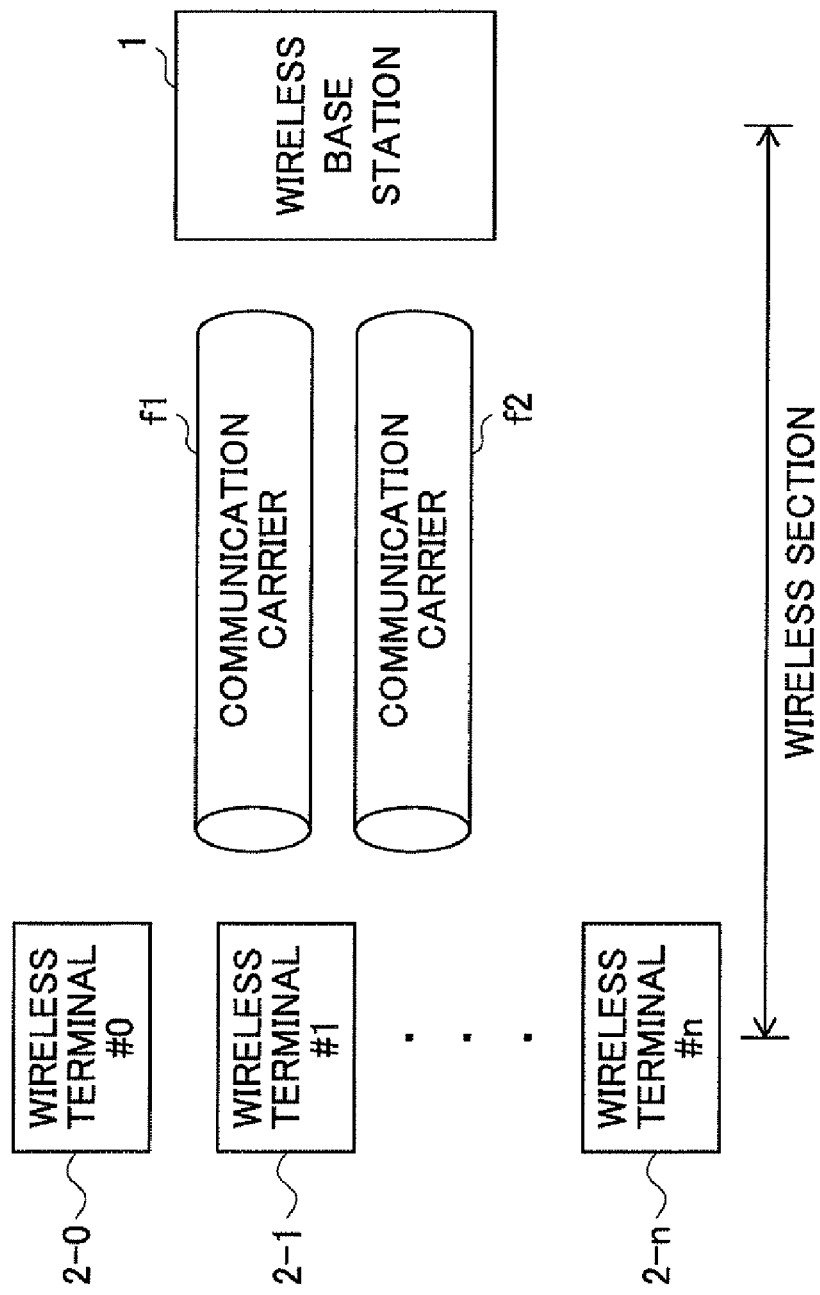
FIG. 6 depicts a wireless network system to which an embodiment of the present invention may be applied.

FIG. 6 depicts a wireless network system to which an embodiment of the present invention may be applied. In this system, a wireless base station 1 and wireless terminals 2-0 through 2-n are connected using two communication carriers f1 and f2.

Generally, for downlink, the wireless base station 1 transmits data to the multiple wireless terminals 2-0 through 2-n, so that transmission arbitration can be performed for all of the wireless terminals. On the other hand, in uplink, the multiple wireless terminals 2-0 through 2-n transmit data to the wireless base station 1, so that transmission arbitration cannot be performed. In other words, the uplink communication tends to experience access contention often. Furthermore, when the uplink and downlink are accommodated on the same communication channel, an uplink/downlink access contention occurs.

Thus, in accordance with an embodiment of the present invention, at least two communication carriers are used for transmitting and receiving data, wherein the communication carrier for downlink and the communication carrier for uplink are determined depending on the type of service handled.

Figure 7:
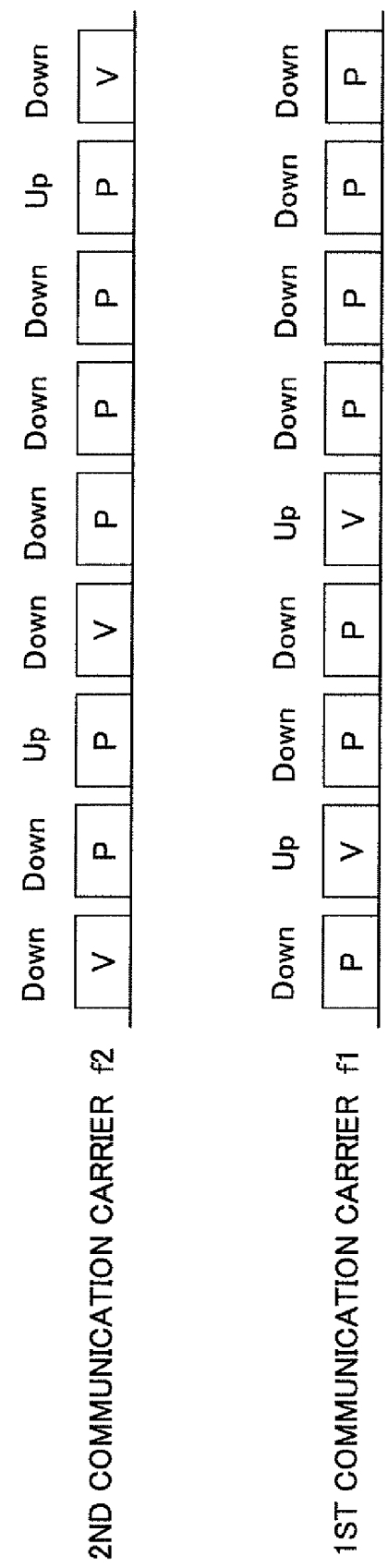
FIG. 7 depicts communication carriers illustrating a carrier allocation according to an embodiment of the present invention.

Referring to FIGS. 7 and 8, when a packet service, which is a non-real-time service, is provided, the first communication carrier f1 is used for downlink packet service, while the second communication carrier f2 is used for both downlink and uplink packet service. When a voice service or a videophone service, which are real-time services, is provided together with the packet service, the first communication carrier f1 may be used for voice service uplink and the second communication carrier f2 may be used for voice service downlink.

The sign "V" in FIG. 7 indicates voice service and the sign "P" indicates packet service. The voice service may include a VoIP (Voice over Internet Protocol) service. Thus, the first communication carrier f1 is used for voice service uplink and packet service downlink, while the second communication carrier f2 is used for both uplink and downlink of the packet service and for downlink voice service.

In FIG. 8, the voice service uplink and the packet service uplink may be exchanged. Namely, the first communication carrier f1 may be used for downlink and uplink of the packet service while the second communication carrier f2 may be used for uplink voice service, downlink packet service, and downlink voice service.

Thus, the communication carrier used is determined by the type of service and transmission direction, wherein at least for a real-time service uplink and a non-real-time service uplink, different communication carriers are used so that access contention between the real-time and non-real-time services can be prevented, for example.

One advantage of the present embodiment is that the frequency of access contention in a CSMA/CA system can be reduced. For example, when the first communication carrier f1 is allocated for packet service downlink and voice service uplink, and the second communication carrier f2 is allocated for packet service uplink/downlink and for voice service downlink, the wireless base station 1 only needs to perform access arbitration for the services allocated within each communication carrier.

With regard to the first communication carrier f1, the wireless base station 1 can manage all of the services, so that the wireless base station 1 can determine the packet size or data generation periods of voice service as a real-time service. While the wireless base station 1 may transmit voice data in downlink using the second communication carrier f2, the behavior of voice data traffic is similar between uplink and downlink.

Thus, the generation timing of voice data or its rough packet size in uplink on the first communication carrier f1 can be inferred. Therefore, the transmission of packet data for downlink using the first communication carrier f1 can be scheduled by avoiding the inferred timing of generation of uplink voice data. In this way, the influence of the downlink packet data on the uplink voice data, i.e., data collision, in the first communication carrier f1 can be avoided.

With regard to the second communication carrier f2, because the downlink voice data and the downlink packet data are transmitted by the wireless base station 1, data transmission can be scheduled so that transmission collisions between the voice data and the packet data can be avoided. However, an access contention may arise between the voice data and packet data in downlink and the packet data in uplink.

In order to avoid this, the wireless base station 1 notifies, in the form of control information, the wireless terminals 2-0 through 2-$n$ about the schedule information of voice data and packet data for downlink, so that the wireless terminals 2-0 through 2-$n$ can autonomously schedule the transmission of uplink packet data.

Thus, the band utilization efficiency of the communication carriers can be averaged by allocating the downlink packet data, which generally contains a large traffic volume, to the two communication carriers. Further, simultaneous transmission and reception can be realized by allocating the uplink and downlink of a real-time service to separate communication carriers.

Embodiments

In accordance with an embodiment of the present invention, a wireless LAN network similar to the system depicted in FIG. 6 is provided. Specifically, the wireless base station 1 of the system of FIG. 6 is configured according to an embodiment of the present invention. Wireless LAN is defined by the IEEE 802.11 standard, which may refer to the wireless base station 1 as an "AP" (Access Point) and the wireless terminals 2-0 through 2-$n$ as "STAB" (Stations).

Figure 9:
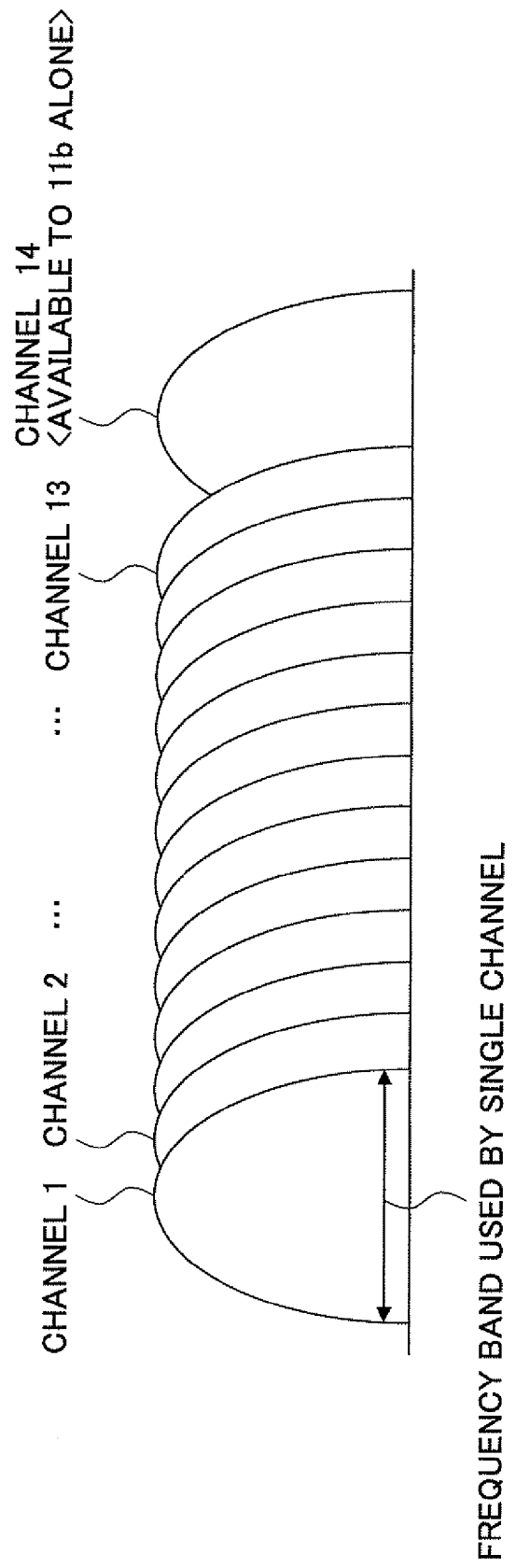
FIG. 9 illustrates a channel allocation according to IEEE 802.11b/g.

Generally, according to IEEE 802.11a, b, and g, one of available channels is used as a communication channel. FIG. 9 illustrates a channel allocation according to IEEE 802.11b/g in which channels that do not interfere with one another are selected out of 13 channels (IEEE 802.11g) or 14 channels (IEEE 802.11b) and used. Such channels that do not interfere with one another are typically three to four out of the 13 and 14 channels. While the band of each channel is 20 MHz, multiple channels cannot be simultaneously used as of now because the channel width for wireless LAN is 20 MHz according to Japanese law, for example. However, a technology that allows channel bonding has been disclosed, as defined by IEEE 802.11n with regard to the simultaneous use of multiple channels. Channel bonding involves the simultaneous use of two communication channels. Similarly, two communication channels are simultaneously used in the present embodiment. The term "channel" is synonymous with the aforementioned "carrier".

When a communication using the wireless network of FIG. 6 is started, a wireless link is established by negotiation between one or more of the wireless terminals 2-0 through 2-$n$ and the wireless base station 1. At this time, the communication carriers used for uplink and downlink are also determined. A communication carrier used for such negotiation is outside the scope of the present invention and is therefore not particularly specified in the present disclosure. Namely, a fixed communication carrier may be allocated, or the wireless terminals and the wireless base station may use an arbitrary communication carrier for reception. For example, in the case of wireless LAN, the MAC (Medium Access Control) frame, which is used for control between the wireless base station and the wireless terminals, may be used for the aforementioned negotiation purposes.

Also, for control data between the wireless base station 1 and the wireless terminals 2-0 through 2-$n$, a communication carrier may be determined depending on the communication direction. Alternatively, the first communication carrier f1 may be allocated in a fixed manner.

The communication carriers used for uplink and downlink are determined by the wireless base station 1. The determination may involve consideration of at least the type of service. For example, at least for an uplink real-time service and an uplink non-real-time service, different communication carriers are used.

For example, for voice service, uplink is allocated to the first communication carrier f1 and downlink is allocated to the second communication carrier f2. For packet service, uplink may be allocated to the second communication carrier f2 and downlink may be allocated to the first communication carrier f1.

In the case of a packet service, traffic status is further considered. Generally, the data volume of packet service downlink is greater than that of packet service uplink, and also greater than that of voice data. Thus, the communication channel for packet service downlink should not be allocated on a connection by connection basis, but should take into consideration the frequency of accessing the communication channel. Therefore, packet service downlink is allocated to the second communication carrier f2 in consideration of traffic status. In this way, the traffic gap between the first communication carrier f1 and the second communication carrier f2 is eliminated. Specifically, in accordance with the present embodiment, the communication channel is determined in accordance with a table (right-hand column) depicted in FIG. 8.

Figure 10:
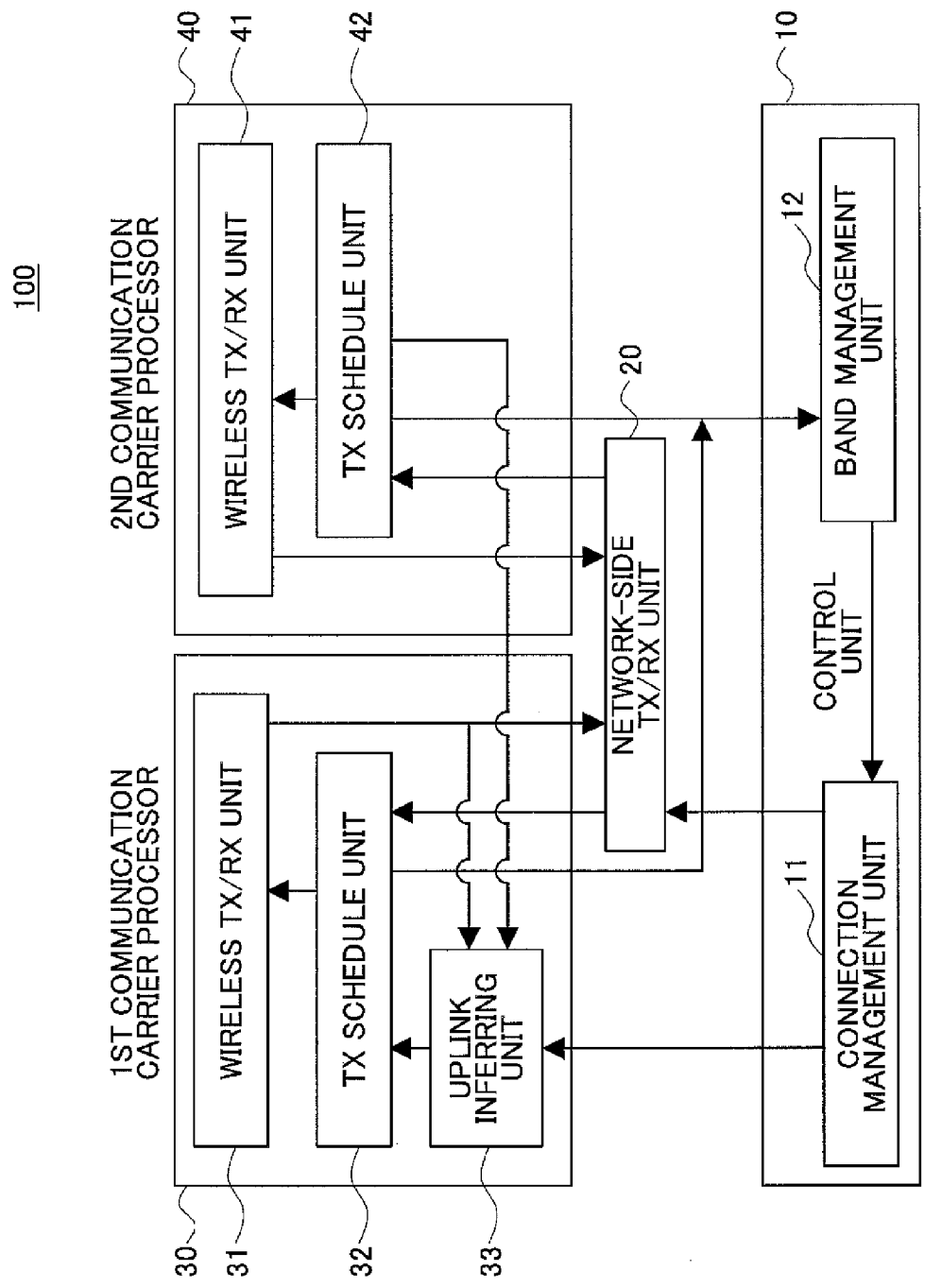
FIG. 10 depicts a block diagram of a wireless base station according to an embodiment of the present invention.

FIG. 10 depicts a block diagram of a wireless base station 100 according to an embodiment of the present invention. The wireless base station 100 includes a control unit 10; a network-side transmitter/receiver unit 20 for communication with a wireless network to which the wireless base station 100 is connected; a first communication carrier processing unit 30 for communication with wireless terminals; and a second communication carrier processing unit 40 for communication with the wireless terminals.

The control unit 10 includes a connection managing unit 11 and a band managing unit 12. The connection managing unit 11 is configured to manage connections for communication that are registered with the wireless network. The band managing unit 12 is configured to manage the band of each connection.

The first communication carrier processing unit 30 includes a wireless transmitter/receiver unit 31, a transmission schedule unit 32, and an uplink inferring unit 33, which is a reception timing inferring unit. The second communication carrier processing unit 40 includes a wireless transmitter/receiver unit 41, which is a control information attaching unit, and a transmission schedule unit 42.

The wireless transmitter/receiver unit 31 performs transmission and reception with each wireless terminal using the first communication carrier f1. The transmission schedule unit 32 implements transmission scheduling for the first communication carrier f1. The wireless transmitter/receiver unit 41 performs transmission and reception with each wireless terminal using the second communication carrier f2. The transmission schedule unit 42 implements transmission scheduling for the second communication carrier f2. The wireless transmitter/receiver unit 41 (or the wireless transmitter/receiver unit 31) also has the function of transmitting schedule information about the downlink voice and packet data on the second communication carrier f2 as control information, using the second communication carrier f2 (or the first communication carrier f1).

The uplink inferring unit 33 is supplied with information about reception timing for uplink real-time service from the wireless transmitter/receiver unit 31. The uplink inferring unit 33 is also supplied with the transmission schedule information about downlink real-time service from the transmission schedule unit 42. Based on such information, the uplink inferring unit 33 generates a reception pattern of the real-time data on the first communication carrier f1, and supplies it to the transmission schedule unit 32.

When a connection is registered with the wireless network, the registered connection is managed by the connection managing unit 11, and also relevant routing information is sent to the network-side transmitter/receiver unit 20 based on the setting information in accordance with the table of FIG. 8 (in the right-hand column). This setting information may be set in the control unit 10 in advance.

Thus, data is allocated to the communication carrier processing units 30 and 40, based on the type of service (packet service or voice service) and the direction (uplink or downlink). For example, when the network-side transmitter/receiver unit 20 receives data from the network and when it is determined that the data is voice data based on its characteristic address, the data is transferred to the second communication carrier processing unit 40 because the data involves voice service downlink. When the data is for packet service downlink, the data is transferred to the first and second communication carrier processing units 30 and 40.

In the example illustrated in FIG. 10, the uplink inferring unit 33 is provided in the first communication carrier processing unit 30. This is in accordance with the settings specified in the right-hand column of the table of FIG. 8. Depending on the settings in the table, the uplink inferring unit 33 may be provided in the second communication carrier processing unit 40, or externally to the communication carrier processing units 30 and 40.

The transmission schedule units 32 and 42 implement transmission scheduling for the data received from the network-side transmitter/receiver unit 20. Because the first communication carrier processing unit 30 handles voice service uplink, processes required by the voice service uplink are performed in the first communication carrier processing unit 30. Specifically, first, the reception timing of uplink voice data, which involves a real-time service, is acquired from the wireless transmitter/receiver unit 31. Second, the schedule information for the transmission of voice data downlink, which involves a real-time service, is acquired from the transmission schedule unit 42 of the second communication carrier processing unit 40. Both these information items are acquired by the uplink inferring unit 33, which then generates a reception pattern of the real-time data whose reception via the first communication carrier f1 is inferred. The uplink inferring unit 33 then sends the reception pattern to the transmission schedule unit 32 of the first communication carrier processing unit 30.

Figure 11:
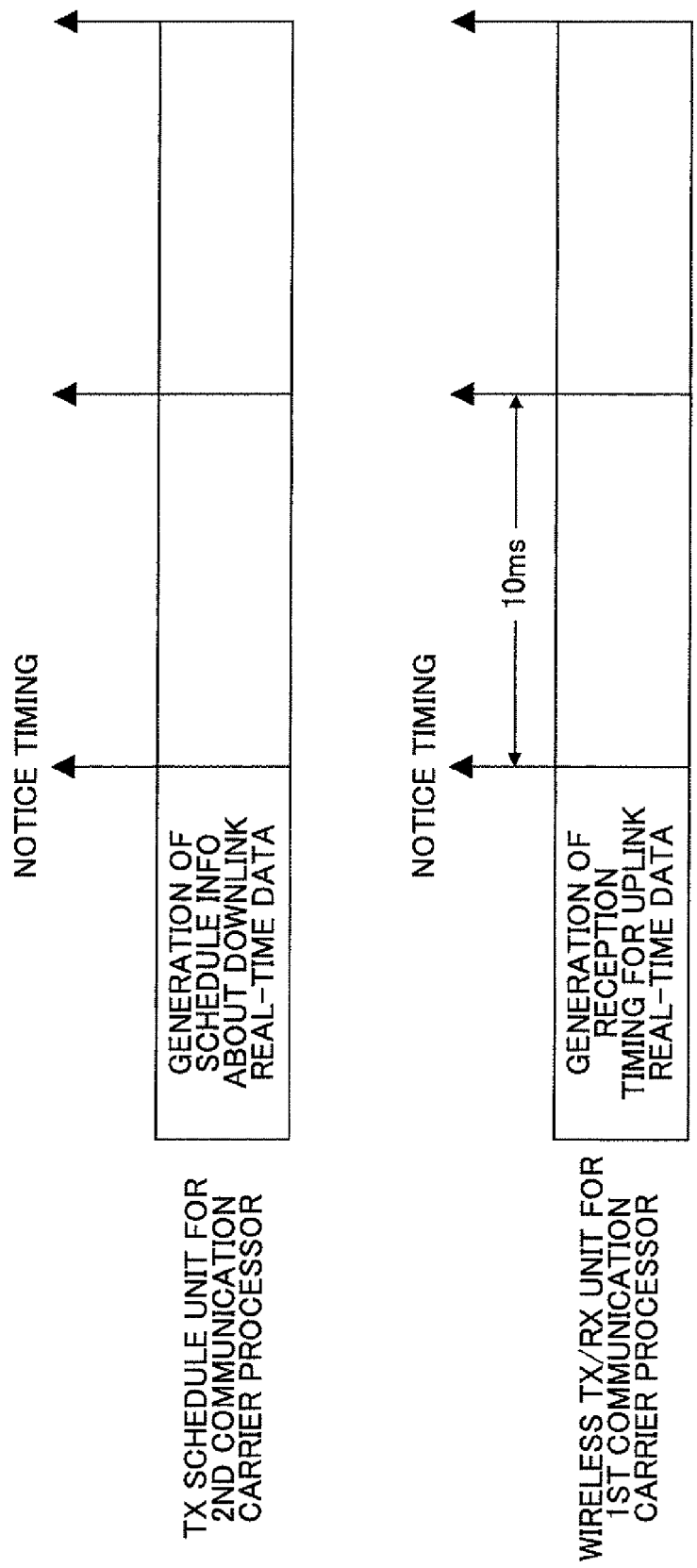
FIG. 11 illustrates information acquisition timings for an uplink inferring unit.

The uplink inferring unit 33 acquires the respective information items from the transmission schedule unit 42 and the wireless transmitter/receiver unit 31 at certain periods. For instance, when the periods of generation of the information by the transmission schedule unit 42 are 10 ms, the uplink inferring unit 33 acquires the transmission schedule information for downlink voice data from the transmission schedule unit 42 and the reception timing information for uplink voice data from the uplink inferring unit 33 at the same periods of 10 ms, as illustrated in FIG. 11. The information acquisition timings are aligned for offset value compensation, as will be described later.

Inferring of the reception timing is discussed with reference to FIG. 12. First, the second communication carrier processing unit 40 (FIG. 10) implements transmission scheduling, and downlink voice data is transmitted to a wireless section as per the schedule. Thus, the schedule information can be thought of as being future traffic information. By notifying the first communication carrier processing unit 30 about such information, the reception timing (and pattern) of uplink voice data can be inferred by the first communication carrier processing unit 30. It is assumed that, because voice data packets are generated at 20 ms periods, the same reception pattern as the transmission pattern is generated by the first communication carrier processing unit 30 at the 20 ms cycles.

Figure 12:
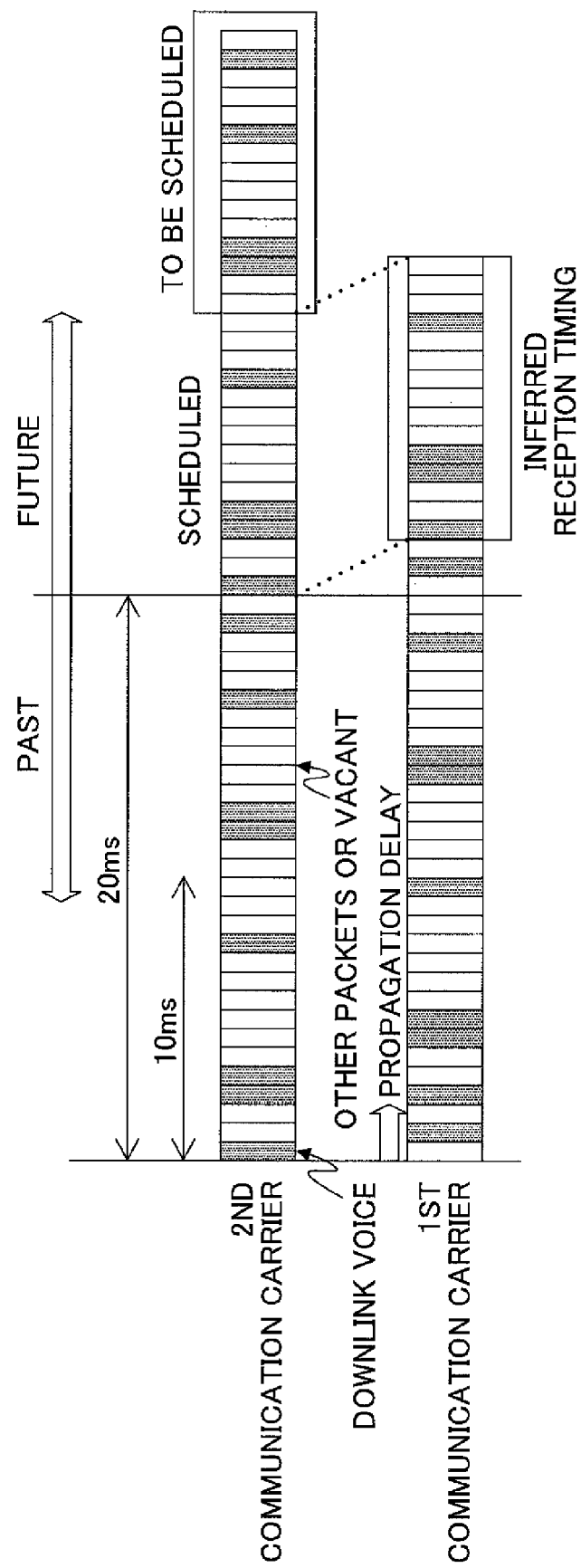
FIG. 12 illustrates a reception timing inferring procedure.

As illustrated in FIG. 12, the inferred reception timing of uplink voice data takes into consideration a propagation delay as an offset value. In an initial state, a predetermined propagation delay value is given as a system parameter. Thus, the inferred reception timing is shifted from the transmission timing of downlink voice data by the propagation delay offset. During system operation, the offset information (propagation delay value) is corrected based on the reception timing generated by the second communication carrier processing unit 40 and the error information obtained from the inferred reception timing.

Figure 13:
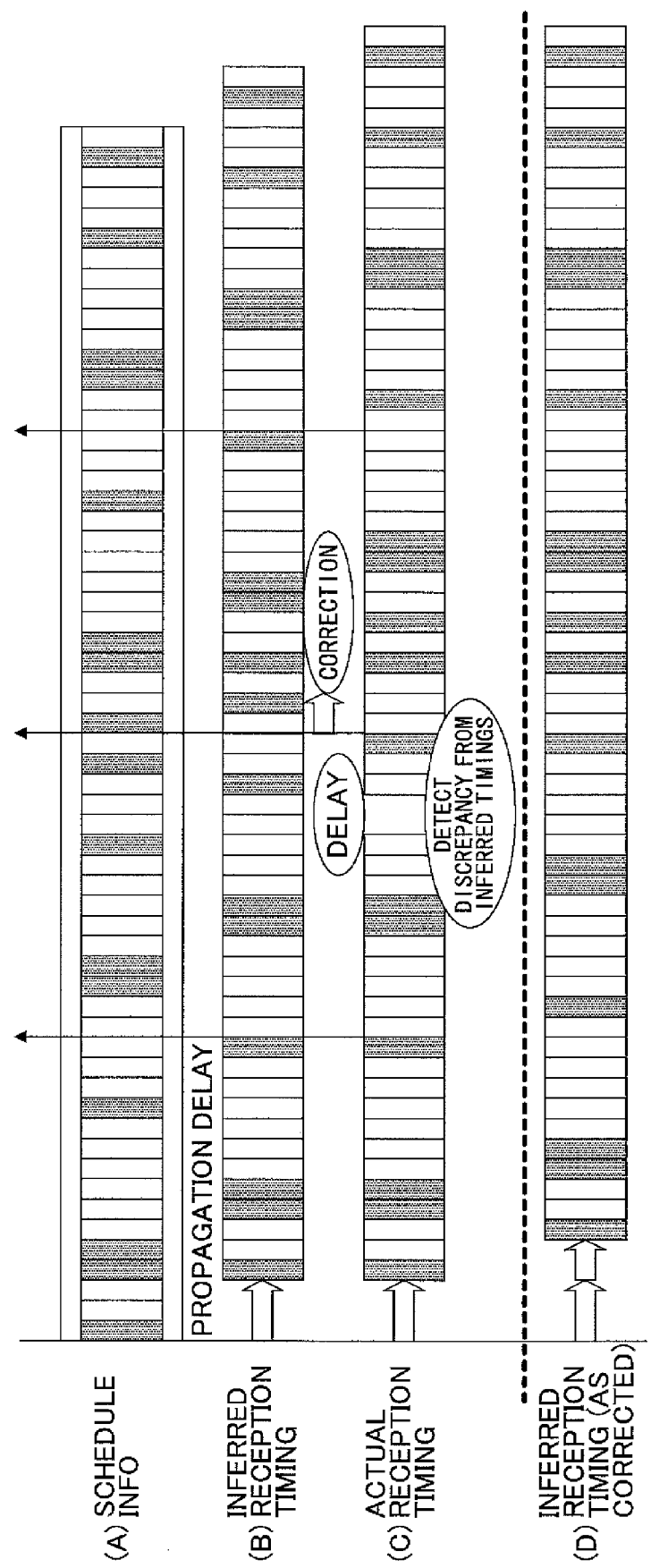
FIG. 13 illustrates an offset information correcting procedure.

FIG. 13(A) depicts the transmission schedule information (transmission pattern) obtained from the transmission schedule unit 42. FIG. 13(B) depicts the inferred reception timing inferred from the transmission schedule information. FIG. 13(C) depicts an actual reception timing. If a gap is detected between the inferred reception timing and the actual reception timing, a value corresponding to that gap is added to the offset value, thus correcting the inferred reception timing, as depicted in FIG. 13(D).

Figure 14:
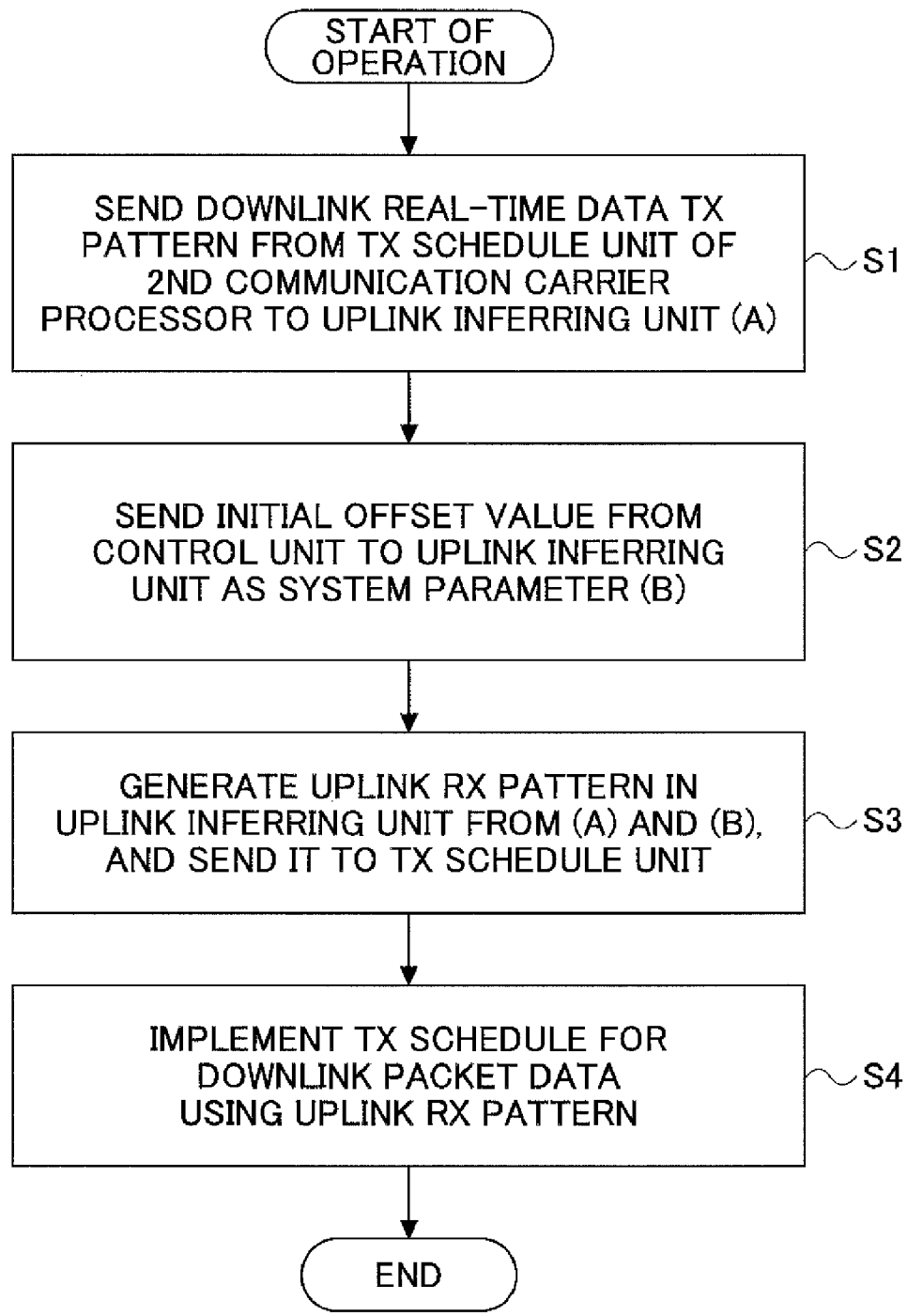
FIG. 14 depicts a flowchart of a process performed at the start of an operation according to an embodiment of the present invention.

FIG. 14 depicts a flowchart of a process performed in the wireless base station 1 at the start of an operation according to an embodiment of the present invention. In step S1, the transmission schedule unit 42 of the second communication carrier processing unit 40 notifies the uplink inferring unit 33 (reception timing inferring unit) about the transmission pattern of voice data downlink, which is a real-time service. In step S2, the control unit 10 notifies the uplink inferring unit 33 about the initial offset value, i.e., the predetermined propagation delay value given as a system parameter.

In step S3, the uplink inferring unit 33 generates a reception pattern of uplink voice data based on the transmission timing of downlink voice data and the initial offset value, and then notifies the transmission schedule unit 32. In step S4, the transmission schedule unit 32 generates a transmission pattern of downlink packet data based on the reception pattern of uplink voice data, and implements the transmission schedule.

Figure 15:
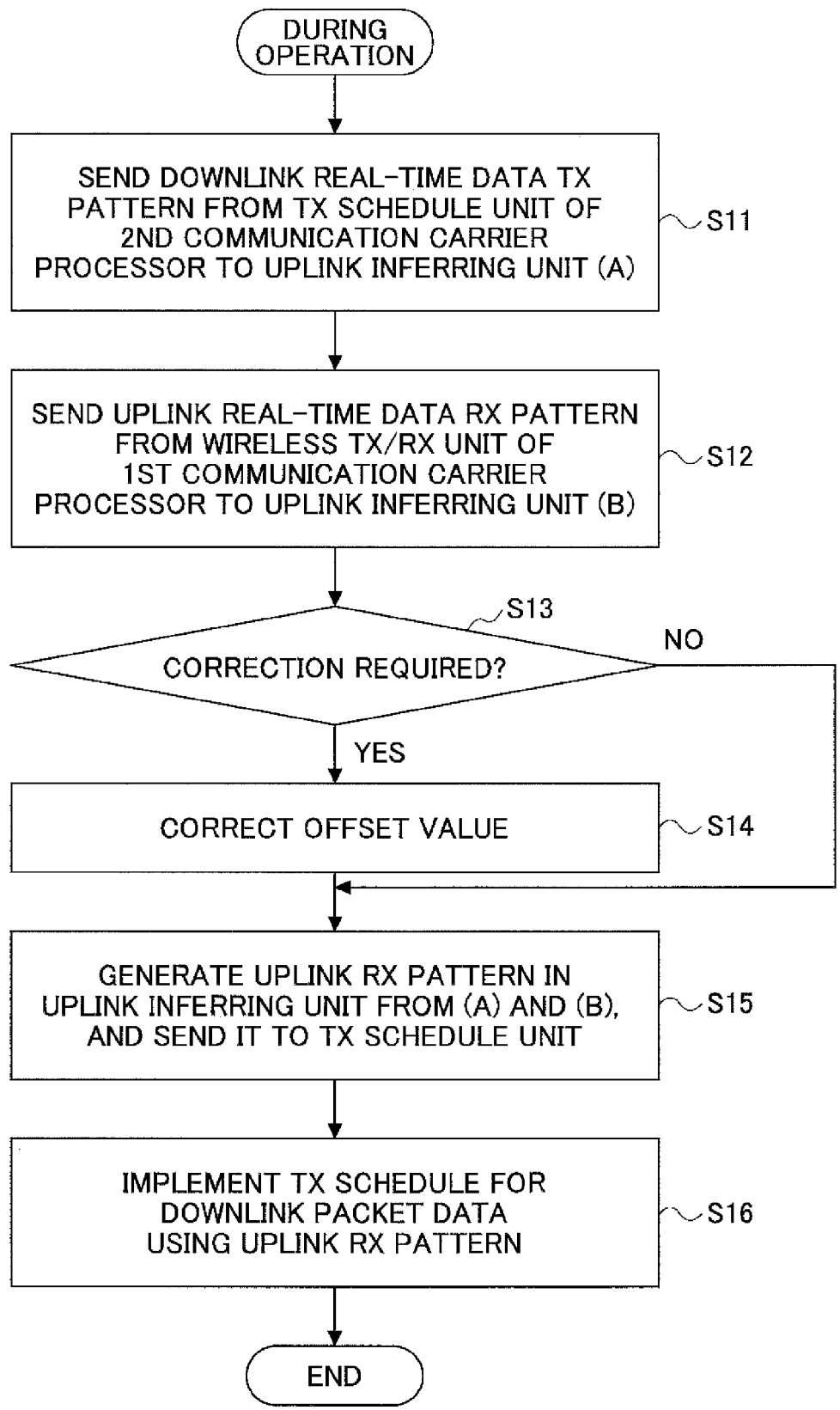
FIG. 15 depicts a flowchart of a process during an operation according to an embodiment of the present invention.

FIG. 15 depicts a flowchart of a process performed within the wireless base station 1 during an operation according to an embodiment of the present invention. In step S11, the transmission schedule unit 42 of the second communication carrier processing unit 40 notifies the uplink inferring unit 33 about a transmission pattern of downlink voice data, which is a real-time service. In step S12, the wireless transmission unit 31 of the first communication carrier processing unit 30 notifies the uplink inferring unit 33 about a reception pattern of uplink voice data, which is a real-time service.

In step S13, the uplink inferring unit 33 determines whether a correction is needed based on whether the error between the inferred reception pattern from the transmission schedule unit 42 and the reception pattern from the wireless transmission unit 31 exceeds a predetermined threshold value. If the correction is required, an error value is added to the original offset value in step S14, thus correcting the original offset value.

Thereafter, in step S15, the uplink inferring unit 33 generates an uplink reception pattern (including its timing) of voice data based on the downlink transmission timing of voice data and the initial offset value, and then notifies the transmission schedule unit 32. In step S16, the transmission schedule unit 32 generates a transmission pattern of the downlink packet data based on the uplink reception pattern of voice data, and then implements the transmission schedule.

Figure 16:
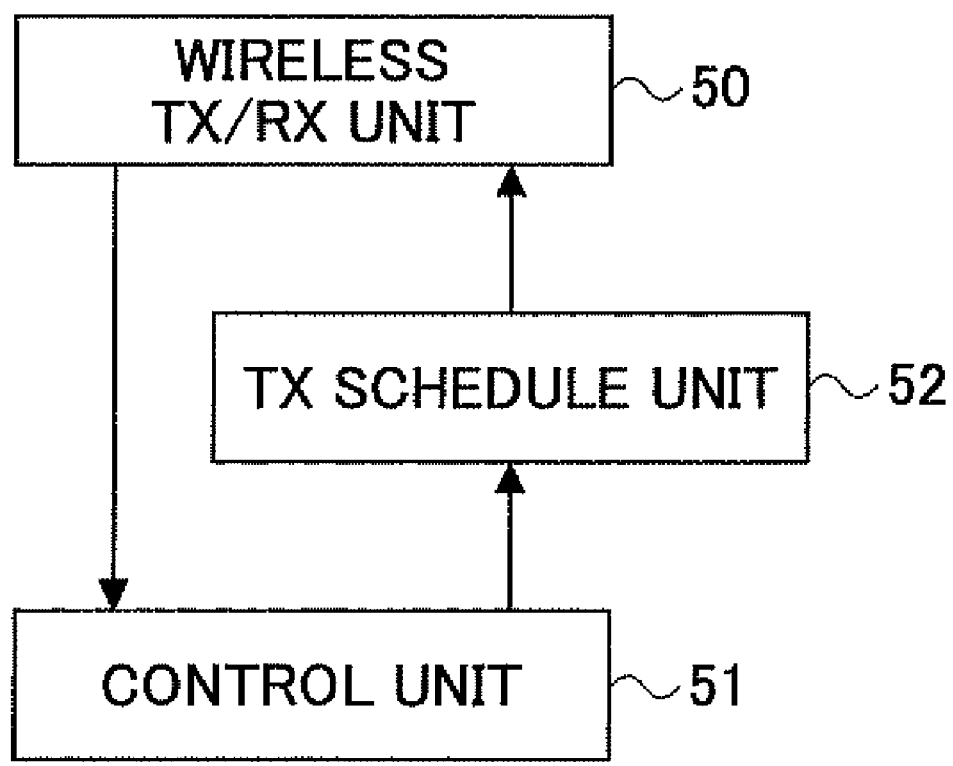
FIG. 16 depicts a block diagram of a wireless terminal according to an embodiment of the present invention.

FIG. 16 depicts a block diagram of a wireless terminal 2 according to an embodiment of the present invention. The wireless terminal 2 includes a wireless transmitter/receiver unit 50 (extracting unit) for transmission and reception with the wireless base station 1 using the first communication carrier f1 and the second communication carrier f2; a control unit 51; and a transmission schedule unit 52 (autonomous schedule unit).

The wireless transmitter/receiver unit 50 extracts control information from the second communication carrier f2 (or the first communication carrier f1) and notifies the control unit 51. The control unit 51 then extracts from the control information the reception timings of voice data and packet data in the downlink of the second communication carrier f2, and supplies the reception timings to the transmission schedule unit 52.

The transmission schedule unit 52 then generates a transmission timing of uplink packet data on the second communication carrier f2 that avoids the reception timing of the voice data and packet data in the downlink of the second communication carrier f2. The transmission schedule unit 52 also generates a transmission timing of uplink voice data on the first communication carrier f1. Based on the above transmission patterns, the transmission schedule unit 52 autonomously schedules the transmission of the uplink voice data by the first communication carrier f1 and the uplink packet data by the second communication carrier f2.

Thus, the transmission of uplink packet data is autonomously scheduled by each of the wireless terminals 2-0 through 2-n based on the schedule information from the wireless base station 1. In this way, access contention between the downlink voice/packet data and the uplink packet data in the wireless base station 1 can be avoided.

In accordance with another embodiment, the wireless terminals 2-0 through 2-n may not be provided with the transmission schedule unit 52. In this case, however, access contention between the downlink voice/packet data and the uplink packet data may occur in the wireless base station 1.

Thus, by controlling the number of times of wireless access contention, communication quality can be improved when a real-time service, such as VoIP service or videophone service, is utilized in a wireless LAN. Furthermore, an improved band utilization efficiency can be obtained compared with an FDD system.

Thus, the present invention has been described herein with reference to preferred embodiments thereof. While the present invention has been shown and described with particular examples, it should be understood that various changes and modification may be made to the particular examples without departing from the broad spirit and scope of the present invention as defined in the claims. That is, the scope of the present invention is not limited to the particular examples and the attached drawings.

What is claimed is:

1. A wireless access method comprising:
  connecting a wireless base station and a plurality of wireless terminals using a first communication carrier and a second communication carrier according to a hybrid-duplex system;
  allocating uplink data of a real-time service to the first communication carrier, allocating uplink data of a non-real-time service to the second communication carrier, allocating downlink data of the real-time service to one of the first communication carrier and the second communication carrier, and allocating downlink data of the non-real-time service to the first and second communication carriers, based on a type of service and a communication direction; and inferring a reception timing of the uplink data of the real-time service allocated to the first communication carrier, based on transmission schedule information for the downlink data of the real-time service allocated to the second communication carrier, and scheduling transmission for the downlink data of the non-real-time service allocated to the first communication carrier by avoiding the reception timing.

2. The wireless access method according to claim 1, wherein the inferring infers the reception timing by shifting the transmission schedule information by an offset value corresponding to a propagation delay in a wireless section.

3. The wireless access method according to claim 2, further comprising:

correcting the reception timing by adding, to the offset value, an error between the reception timing and an actual reception timing of the uplink data of the real-time service allocated to the first communication carrier.

4. A wireless base station apparatus in a wireless access system, the wireless base station comprising:

a first transmission schedule unit configured to schedule transmission for downlink data of a real-time service allocated to a first communication carrier;

an inferring unit configured to infer a reception timing of uplink data of the real-time service allocated to a second communication carrier, based on transmission schedule information of the first transmission schedule unit; and a second transmission schedule unit configured to schedule transmission for downlink data of a non-real-time service allocated to the second communication carrier by avoiding the reception timing.

5. The wireless base station apparatus according to claim 4, wherein the first transmission schedule unit periodically notifies the transmission schedule information to the inferring unit.

6. The wireless base station apparatus according to claim 5, wherein the inferring unit infers the reception timing by shifting the transmission schedule information by an offset value corresponding to a propagation delay in a wireless section.

7. The wireless base station apparatus according to claim 6, wherein the inferring unit corrects the reception timing by adding, to the offset value, an error between the reception timing and an actual reception timing of the uplink data of the real-time service allocated to the second communication carrier.

8. The wireless base station apparatus according to claim 4, further comprising:

an attaching unit configured to attach the transmission schedule information, as control information, to one of the first communication carrier and the second communication carrier.

9. A wireless terminal apparatus in a wireless access system, the wireless terminal apparatus comprising:

an extracting unit configured to extract transmission schedule information for downlink data of a real-time service, attached to a first communication carrier and a second communication carrier, from one of the first communication carrier and the second communication carrier; and a schedule unit configured to autonomously schedule transmission for uplink data of a non-real-time service allocated to the second communication carrier, based on the transmission schedule information extracted by the extracting unit.

* * * * *